(12) United States Patent
Jiang et al.

(10) Patent No.: US 11,646,866 B2
(45) Date of Patent: May 9, 2023

(54) BLOCKCHAIN BASED SERVICE RESERVATION AND DELEGATION

(71) Applicant: INTERNATIONAL BUSINESS MACHINES CORPORATION, Armonk, NY (US)

(72) Inventors: Li Jiang, Beijing (CN); Li Ni Zhang, Beijing (CN); Wen Rui Zhao, Beijing (CN); Jing Bo Jiang, Beijing (CN); Yu Zhao, Beijing (CN); Lan Luo, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 17/099,860

(22) Filed: Nov. 17, 2020

(65) Prior Publication Data

US 2022/0158818 A1     May 19, 2022

(51) Int. Cl.
*H04L 9/00* (2022.01)
*H04L 9/06* (2006.01)
(Continued)

(52) U.S. Cl.
CPC .............. *H04L 9/0618* (2013.01); *H04L 9/50* (2022.05)

(58) Field of Classification Search
CPC ..... H04L 9/0618; H04L 2209/38; H04L 9/50; H04L 63/12; H04L 63/10; H04L 67/1097; H04W 28/26; G06F 16/2379
See application file for complete search history.

(56) References Cited

U.S. PATENT DOCUMENTS

| 8,065,515 B2 | 11/2011 | Droms |
| 11,265,169 B1 * | 3/2022 | Rowe ................. H04L 9/3247 |

(Continued)

FOREIGN PATENT DOCUMENTS

| CN | 109102664 A | 12/2018 |
| CN | 114513528 A | 5/2022 |

(Continued)

OTHER PUBLICATIONS

An overview of smart contract and use cases in blockchain technology, by Panda et al., published 2018 (Year: 2018).*

(Continued)

*Primary Examiner* — Vu V Tran
(74) *Attorney, Agent, or Firm* — Jordan T. Schiller

(57) ABSTRACT

A computer-implemented method, computer system, and computer program product for blockchain enabled service reservation and delegation. The present invention may include receiving one or more first or second trigger conditions defined by a user, detecting an occurrence of the one or more first trigger conditions, deploying a smart contract based on the received one or more first trigger condition, detecting an occurrence of the one or more second trigger conditions, and deactivating the smart contract based on the received one or more second trigger conditions. The present invention may include receiving a subject registration, the subject is the user, a service, or a device. The one or more first trigger conditions may be a condition that upon its occurrence may initiate the deployment of the smart contract. The one or more second trigger conditions may be a condition that upon its occurrence may initiate the deactivation of the smart contract.

20 Claims, 6 Drawing Sheets

(51) Int. Cl.
*H04L 9/40* (2022.01)
*H04L 67/1097* (2022.01)
*H04W 28/26* (2009.01)
*G06F 16/23* (2019.01)

(56) References Cited

U.S. PATENT DOCUMENTS

| | | | |
|---|---|---|---|
| 2007/0088663 | A1 | 4/2007 | Donahue |
| 2016/0028726 | A1 | 1/2016 | Matthews |
| 2016/0283920 | A1 | 9/2016 | Fisher |
| 2019/0150036 | A1 | 5/2019 | Nelson |
| 2019/0191293 | A1 | 6/2019 | Nelson |
| 2019/0394637 | A1 | 12/2019 | Viswanathan |
| 2020/0394654 | A1* | 12/2020 | Concannon .......... G06Q 20/388 |
| 2021/0081404 | A1* | 3/2021 | Kempf ................ G06F 16/2379 |
| 2021/0109797 | A1* | 4/2021 | Zhou ...................... G06Q 20/42 |
| 2021/0295283 | A1* | 9/2021 | Deng .................. G06Q 20/0658 |
| 2022/0066896 | A1* | 3/2022 | Zhang .................. G06F 11/3006 |
| 2022/0092056 | A1* | 3/2022 | Sekar ................... G06Q 30/016 |

FOREIGN PATENT DOCUMENTS

| | | |
|---|---|---|
| DE | 102021125847 A1 | 5/2022 |
| EP | 2280524 A2 | 2/2011 |
| GB | 2603834 A | 8/2022 |
| JP | 2022080277 A | 5/2022 |

OTHER PUBLICATIONS

Smart contracts, blockchain, and the next frontier of transactional law, by Wilka et al., published 2017 (Year: 2017).*
Matetic et al., "DelegaTEE: Brokered Delegation Using Trusted Execution Environments", This paper is included in the Proceedings of the 27th USENIX Security Symposium, Aug. 15-17, 2018, Baltimore, MD, USA, USENIX Association, 18 pages.
Mell et al., "The NIST Definition of Cloud Computing", Recommendations of the National Institute of Standards and Technology, Special Publication 800-145, Sep. 2011, 7 pages.
Intellectual Property Office, "Combined Search and Examination Report under Sections 17 and 18(3)," UK Intellectual Property Office, dated Jun. 9, 2022, 7 pages, International Application No. GB2115783.9.
Jiang, et al., "Blockchain Based Service Reservation and Delegation," Application and Drawings, Filed on Nov. 3, 2021, 39 Pages, Related GB Patent Application Serial No. 2115783.9.
Jiang, et al., "Blockchain Based Service Reservation and Delegation," Application and Drawings, Filed on Nov. 9, 2021, 28 Pages, Related CN Patent Application Serial No. 202111318035.6.
Jiang, et al., "Blockchain Based Service Reservation and Delegation," Application and Drawings, Filed on Oct. 27, 2021, 39 Pages, Related JP Patent Application Serial No. 2021-175502.
Jiang, et al., "Blockchain Based Service Reservation and Delegation," Application and Drawings, Filed on Oct. 5, 2021, 37 Pages, Related DE Patent Application Serial No. 10 2021 125 847.2.
Office Action Response to a foreign counterpart application, UK Patent Application No. 2115783.9, filed Nov. 3, 2021, Publication No. GB2603834, dated Nov. 14, 2022, 3 pages.

* cited by examiner

BLOCKCHAIN BASED SERVICE RESERVATION AND DELEGATION

BACKGROUND

The present invention relates generally to the field of computing, and more particularly to reservation and delegation. A typical service model includes users, devices, and providers. Once a user subscribes to a service, the user may use the service with a device that the provider may have specified and delivered. It may require binding the user, the device, and the provider throughout the service lifecycle.

Blockchain technology is a decentralized and distributed digital ledger that can record transactions between two or more parties efficiently and in a verifiable and permanent way. The ledger itself can also be programmed to trigger transactions automatically. A blockchain maintains a continuously growing list of records, called blocks, secured from tampering and revision. Each block contains a timestamp and a link to a previous block. By design, blockchain technology is inherently resistant to modification of the data—once recorded, the data in a block cannot be altered retroactively. Through the use of a peer-to-peer network and a distributed timestamping server, a blockchain database is managed autonomously. A decentralized consensus algorithm of blockchain technologies allows several entities to maintain a shared record of information without each entity requiring trust from each other entity since consensus is formed on a per-network basis. The networked model produces a system with the advantages of censorship resistance, tamper resistance, and a system with no single point of failure.

A blockchain may use smart contracts to define the transactions conducted among various blockchain participants. Smart contracts are computer programs that both express the contents of a contractual agreement and operate the implementation of the content, based on triggers provided by users of a smart contract or extracted from a blockchain environment. Smart contracts may have a user interface and often emulate contractual clauses. Smart contracts aim to provide security superior to traditional contract law and to reduce other transaction costs associated with contracting.

Within the context of blockchain technology, smart contracts may include scripts that can be stored on a blockchain network. Since smart contracts reside on the blockchain, smart contracts have a unique address. Smart contracts may be triggered by messages or transactions sent to its addresses. Conditions for accessing and exploiting smart contracts are limited in their capacity to reduce the likelihood of unauthorized access to the blockchain assets. Once triggered, smart contracts may automatically execute, control or document legally relevant events and actions according to the terms of the contract or an agreement.

BRIEF SUMMARY

Embodiments of the present invention may include a method, computer system, and computer program product for blockchain enabled reservation and delegation. The present invention may include receiving one or more first or second trigger conditions defined by a user, detecting an occurrence of the one or more first trigger conditions, deploying a smart contract based on the received one or more first trigger condition, detecting an occurrence of the one or more second trigger conditions, and deactivating the smart contract based on the received one or more second trigger conditions. The present invention may include receiving a subject registration, the subject is the user, a service, or a device. The one or more first trigger conditions may be a condition that upon its occurrence may initiate the deployment of the smart contract. The one or more second trigger conditions may be a condition that upon its occurrence may initiate the deactivation of the smart contract. The smart contract may be a reservation smart contract or a deployment smart contract. Deploying the smart contract may include running a delegation. The delegation may be one or more of switching from one service provider to another service provider, switching from one device to another device, or switching from a physical key to a virtual key. Deactivating the smart contract may include removing a delegation, and reverting back to a pre-delegation setting.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
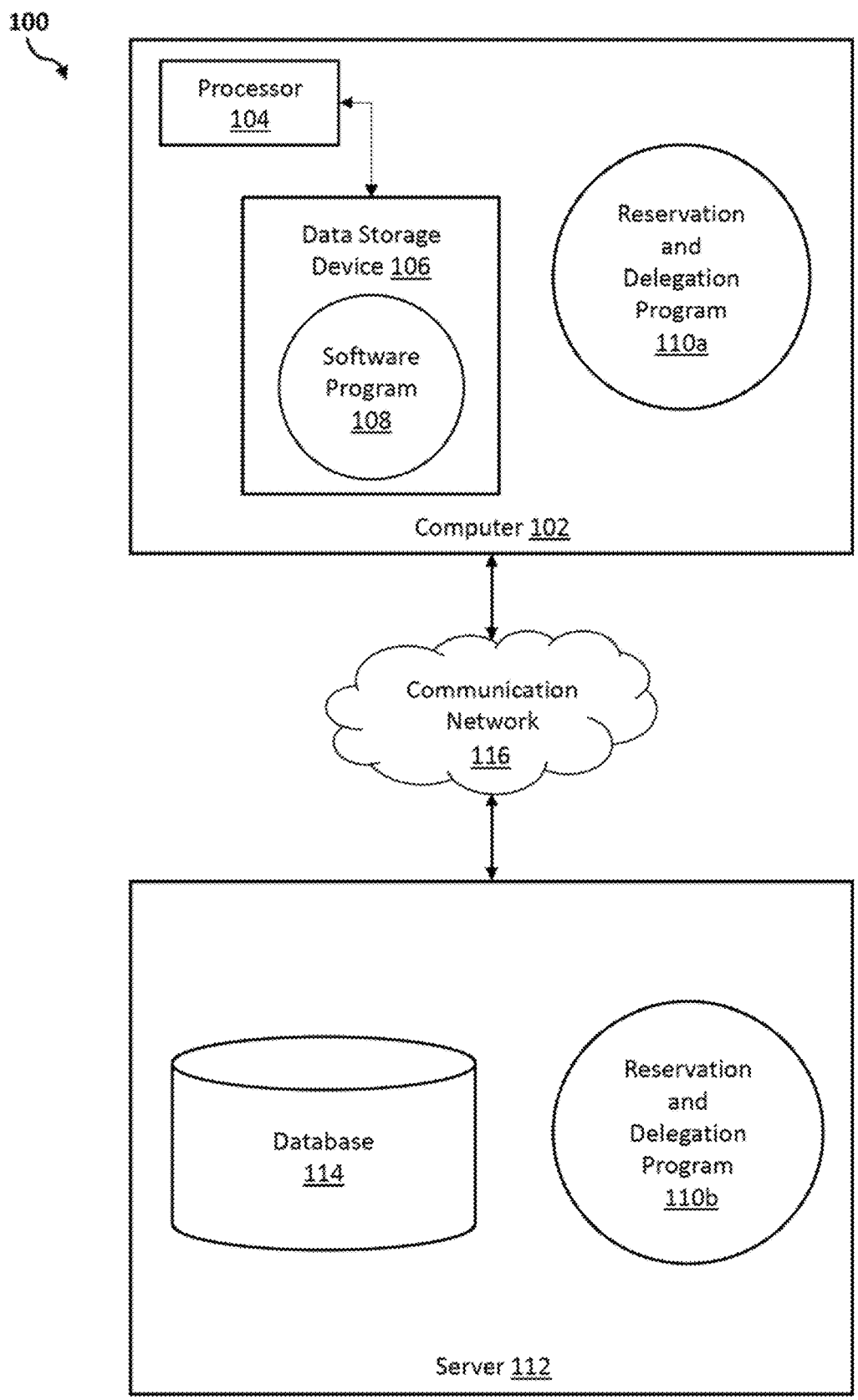
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

Embodiments of the present invention relate generally to the field of computing, and more particularly to blockchain enabled reservation and delegation. The blockchain enabled reservation and delegation may refer to the reservation and delegation of a particular device from one user to another user. The blockchain enabled reservation and delegation may also refer to the reservation and delegation of a service or a device.

A typical service model may include one or more users, one or more devices, and one or more providers. For example, a user has a smart phone that the user utilizes to make phone calls. The smart phone is the device, and the provider is the company that is providing the cell phone service. If any of the three parts is unavailable, then the service model is broken.

Current reservation and delegation issues may include broken connections between users or user devices, services or service devices and networks. For example, typical service models contain multiple users, multiple devices, and multiple providers. A user operating a smart phone to make a phone call may experience disruption due to issue with the provider or the cell phone service. For example, if the user is in a train and the train enters a tunnel, the user loses the network connection and is unable to make any phone calls. A user operating a smart phone to make a phone call may experience disruption when the user's smart phone runs out of battery. As a result, the user is unable to make phone calls and the service model is broken.

A break in the service model may be problematic. This is due to the fact that once the user subscribes to a service or to a device, the user is locked into using the service or the device that the provider specified and delivered. Oftentimes, the user, the device, and the provider are bound together throughout the service lifecycle, creating many drawbacks.

One such drawback of binding the user, the device, and the provider throughout the service lifecycle may be the impossibility of switching to some other service provider for the same service. For example, a user traveling from one country to another may have a hard time changing wireless data service when in the other country. As a result, when in another country, the user may be unable to use the wireless data service. Another drawback may deal with cost. It may be costly to change to other device for service authentication if the specified device is not available. For example, a user is attempting to pay for a purchase, using the user's device, such as, for example, a smart phone. The user's smart phone runs out of battery and, as a result, the user is unable to complete the transaction. It may be costly for the user to change the network service from the user's smart phone that ran out of battery to another device that is fully charged in order for the user to complete the transaction.

Yet another drawback of binding the user, the device, and the provider for the duration of the service lifecycle may deal with sharing the service or the device with other users whenever the service or the device is needed. For example, a user may wish to borrow a car from a friend. The friend may have the physical key to the car. However, it would be impossible for the user to get the key from the friend because of proximity to the physical key. As a result, even though the friend may authorize the user to borrow the car, the user is unable to do so because of the unavailability of the car's physical key.

As described herein above, there are many drawbacks that are associated with binding the user, the device, and the provider together for the duration of the service lifecycle. As such, there exists a need to allow for a reservation and/or delegation of service providers and/or devices. Embodiments of the present invention provide using blockchain smart contracts to temporarily reserve and delegate services, service providers, consumer devices, and users. As a result, services do not need to be tightly coupled with any devices or users. This allows the user to get greater flexibility to temporarily use different services and devices when the user's own services or devices are unavailable. For example, utilizing blockchain enabled service reservation and delegation may allow for automatic provider switching or dynamic device registering and sharing. This may result in greater user satisfaction, more flexibility to choose different devices, and more usage of the services and/or devices due to ease of sharing the services and/or devices with other users, such as, colleagues, friends, or family members.

Embodiments of the present invention use may use a blockchain network operating with smart contracts that are used to define various types of relationships between users, providers or servicers and devices. The relationships may be used to define multiple different trigger conditions. For example, a first trigger condition may be used to activate or deploy a smart contract and a second trigger condition may be used to deactivate the smart contract. As such, embodiments of the present invention have the capacity to improve the technical field of blockchain by utilizing smart contracts to execute a temporary delegation that allows the switching from one service provider to another service provider, or switching service from one device to another without interruption to the user. The trigger conditions may activate or deactivate the smart contract based on their occurrence.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and reservation and delegation program 110*a*. The networked computer environment 100 may also include a server 112 that is enabled to run a reservation and delegation program 110*b* that may interact with a database 114 and a communication network 116. The server 112 may also be referred to as the server computer.

The networked computer environment 100 may include a plurality of computers 102 and servers 112, only one of which is shown. The server 112 may also be a server computer. The communication network 116 may include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904b, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the reservation and delegation program 110a, 110b may interact with a database 114 that may be embedded in various storage devices, such as, but not limited to a computer 102, a networked server 112, or a cloud storage service.

According to the present embodiment, a user using a client computer 102 or a server computer 112 may use the reservation and delegation program 110a, 110b (respectively) to reserve or delegate a service or a device. The method of reserving or delegating a service, a device, or a user is explained in more detail below with respect to FIGS. 2-3.

Figure 2:
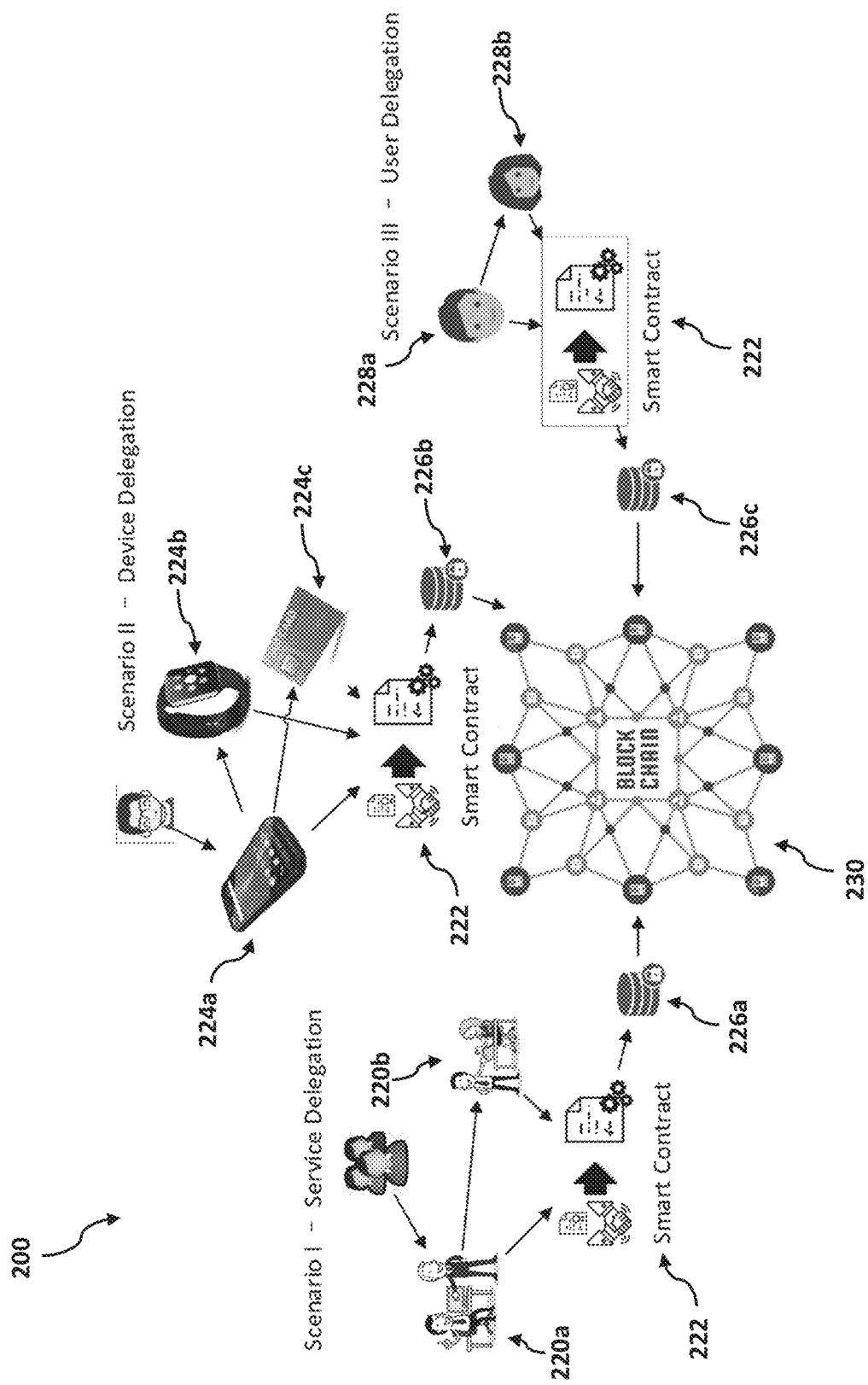
FIG. 2 is a block diagram of an example overall architecture of a reservation and delegation system, in accordance with an embodiment of the invention.

Referring to FIG. 2, a block diagram illustrating an example overall architecture 200 of a reservation and delegation system, in accordance with an embodiment of the invention. The architecture 200 illustrates three different scenarios in which the reservation and delegation program 110a, 110b may reserve and delegate a service or a device. The different scenarios may include, but are not limited to, a service delegation scenario, a device delegation scenario, and a user delegation scenario.

The service delegation scenario may include one or more users, a service provider one 220a, a service provider two 220b, and a smart contract 222. The service delegation scenario provides an example of how the service provider one 220a may migrate its users to the service provider two 220b when the service provider one 220a is experiencing issues with its service. The service from the service provider one 220a may be reserved and delegated to the service provider two 220b. The service providers 220a, 220b, may refer to companies that provide a particular service to the user, such as, network, storage, or processing service. For example, service providers 220a, 220b may be telephone companies, internet service providers, application service providers, storage service providers, or content providers. It should be appreciated that even though two service providers are illustrated, embodiments of the present invention contemplate one or more service providers.

A given service may be provided by multiple service providers 220a, 220b. For example, a network service may be provided by service providers 220a, 220b, and 220n (not illustrated). All of the service providers 220a, 220b and the particular services they provide may be tracked on blockchain 230.

The smart contract 222 may be stored on the blockchain 230 in the reservation and delegation program 110a, 110b. The smart contract 222 may be a reservation smart contract or a delegation smart contract. The reservation smart contract may specify at least two providers, for example service provider one 220a and service provider two 220b. The service providers 220a, 220b may have its own agreement between themselves which may allow one service provider to provide temporary service when the other service provider has no service. For example, the agreement may be converted into a reservation smart contract in the blockchain to bind the two service providers. For example, service provider one 220a may migrate its users to temporarily utilize the service provided by the service provider two 220b. This type of an agreement may also be set up by a plurality of users among themselves.

In an embodiment, the reservation smart contract may be triggered automatically. In an alternative embodiment, the reservation smart contract may be manually triggered by a user. For example, once the reservation smart contract between the two providers, such as, service provider one 220a and service provider two 220b, is established, the service provider may be automatically switched upon an occurrence of a trigger event. Some examples of trigger events for the reservation smart contract may include, but are not limited to an agreement between service providers, a request from one or more users to bind two devices, or a request to bind two or more services. In order for an automatic switching of service providers to occur, the reservation smart contract may include information regarding automatic binding of two or more service. Automatic binding of the two or more services may occur by synchronizing the contracts signed between two or more service providers. The signed contracts may be stored in blockchain. Alternatively, the user may manually trigger the binding of the two or more services.

The delegation smart contract may provide or contain information regarding what kind of a service is being transferred and to whom. The delegation smart contract may be automatically triggered upon the occurrence of a trigger event. Some examples of a trigger event for the delegation smart contract may include an indication of a low battery of a registered device, limited service provided by the registered service provider, or unavailability of a physical key to a personal vehicle. For example, user A is utilizing a device, which is a smart phone. The user A is utilizing service provider one 220a to provide cell phone service. The user A's smart phone is indicating either a very weak service or no service. Having either a weak service or a no service indication may be an example of the trigger event. As a result, under the delegation smart contract, service may be switched from service provider one 220a to service provider two 220b. For example, the delegation of service may occur as soon as the user device indicates weak service provided by service provider one 220a. For example, the delegation of service occurs as soon as the user device indicates that a weak service is being provided by the service provider one 220a. The weak service will indicate that the device will switch to receive service from another service provider two 220b, allowing user A to not experience an interruption in service.

Another scenario illustrated in the architecture 200 is the device delegation scenario. The device delegation scenario may include one or more devices 224a, 224b, 224c, and the smart contract 222. The device delegation scenario provides an example of how a particular service may be delegated from one device to another device. The devices 224a-c may include, but are not limited to, a mobile device, a telephone, a personal digital assistant, a netbook, a laptop computer, a tablet computer, a desktop computer. The devices 224a-c may also include different types of credit cards. For example, the devices 224a-c may be a smart phone, a smart watch, a credit card, or any other device that may be delegated for use.

The smart contract 222, utilized in the device delegation scenario, may include a reservation smart contract or a delegation smart contract. In an embodiment, the reservation smart contract may provide information as to which devices, owned by the user, may be used for delegation purposes. For example, the user may register the user's smart phone, tablet, one or more credit cards on blockchain 230 and link the devices with the reservation smart contract. Further, the user may specify that if the user's smart phone cannot be used, the service from the user's smart phone may be temporarily transferred to the user's tablet. In an alternative embodiment, the reservation smart contract may also provide information as to which devices, owned by other users, may be used for delegation purposes in addition to the selected devices 224*a-c* owned by the user.

The reservation smart contract may not be automatically triggered upon the occurrence of a trigger event. Rather, the reservation smart contract may be triggered by the user. This may allow the user to control which devices are trustable to receive the transferred service.

The delegation smart contract in the device delegation scenario may define trigger events that may be used to determine when service from one device should be switched over to another device. In addition, the delegation smart contract in the device delegation scenario may also include different authentication methods specified for different devices. For example, the user may define, in the delegation smart contract, that when device one 224*a*, for example, a smart phone, is out of battery, the service may switch to device two 224*b*, for example, a tablet. Further, in order for the service to switch from device one 224*a* to device two 224*b*, the user may input a pin into device two 224*b*, in order to authenticate device two 224*b* for received the service from the service provider.

In an embodiment, the delegation smart contract may be triggered by the user. For example, the user is utilizing the user's smart phone to work. The smart phone is running out of battery. As such, before the smart phone runs out of battery, the user may trigger the delegation smart contract by pairing the smart phone with the tablet. Once paired, the two devices may access the same service with either same or different authentication methods. Once the smart phone is unavailable, the service may be delegated to the tablet such that internet service from the smart phone may be delegated to the tablet. As a result, the user may continue received the service on the table instead of the smart phone.

In another example, the user is utilizing the user's smart phone to work. The smart phone runs out of battery before the user triggered the delegation smart contract to delegate the internet service from the smart phone to another device, such as the tablet. However, under the reservation smart contract, the user specified the user's tablet as one of the devices that may be used to receive service. As such, the user may use the tablet to trigger the delegation contract to receive the internet service that was originally provided to the smart phone. As a result, the internet service may be delegated from one device, the smart phone, to another device, the tablet.

In an alternative embodiment, the delegation smart contract may be automatically triggered. For example, the service provider may detect the battery level of the device that the user is utilizing. Once the battery level of the device reaches a certain level, the service provider may trigger the smart contract and delegate the service to another device.

The delegation of service from one device to another may be temporary. Continuing with the example from above, the delegation smart contract may specify service may be switched to device two 224*b* for a particular duration, such as, for example, 60 minutes. Once the 60 minutes pass, the service may automatically revert back from device two 224*b* to device one 224*a*. The particular duration may refer to a limited amount of time that is specified in the smart contract 222. It may be quantified in minutes, hours, even days.

The third scenario illustrated in the architecture 200 is the user delegation scenario. The user delegation scenario may include the smart contract 222 and one or more users, such as, for example, user one 228*a* and user two 228*b*. The user delegation scenario provides an example of how a device or a service may be delegated from one user, such as, for example user one 228*a*, to another user, such as, for example, user two 228*b*.

The smart contract 222 in the user delegation scenario includes the reservation smart contract and the delegation smart contract. In this scenario, the reservation smart contract may include information such as, who the users are and the relationship between each user. For example, the users 228*a*, 228*b* may be friends, colleagues, or family members. The users 228*a*, 228*b* may have trusted relationships between each other. These trusted relationships may be clearly defined in the reservation smart contract.

The reservation smart contract is triggered by the user. As such, the user may specify other users that may take part in the delegation. The user may specify a plurality of users. In addition, each user relationship is equal. As such, each user must agree to the reservation smart contract in order for the reservation smart contract to be implemented. For example, there are two users, user one 228*a* and user two 228*b*. User one 228*a* wishes to enter into a reservation smart contract with user two 228*b*. The reservation smart contract provides that user one 228*a* may transfer the use of the user's personal vehicle to user two 228*b*. User two 228*b* agrees to the reservation smart contract, and the reservation smart contract is implemented. If, however, user two 228*b* does not agree to the reservation smart contract, then there is no reservation smart contract. The reservation smart contract is not implemented because one party to the contract did not agree to the contract.

The delegation smart contract of the user delegation scenario may include information such as, the services that each user may have or may be able to receive and delegate, or the devices that each user may have and may be able to receive or delegate. Each user may specify a plurality of services, and a plurality of devices that may participate in the delegation. As such, each user may determine what is being delegated and to whom. In addition, each user may determine the trigger events. A trigger event may be an event that, upon its occurrence, may trigger the delegation. Some examples of a trigger event may include, but are not limited to, indication of a low battery of a registered device, limited service provided by the registered service provider, or unavailability of a physical key to a personal vehicle.

The implementation of the reservation and delegation smart contracts may be apparent from the following scenario. For example, user two 228*b* needs a vehicle to go from one city to another. User two 228*b* is authorized, under both the reservation and delegation smart contracts, to use the personal vehicle of user one 228*a*. However, user one 228*a* is away on a business trip and is unable to provide the personal vehicle's physical key to user two 228*b*. Nevertheless, utilizing the delegation smart contract, user two 228*b* may receive a virtual identification or a token that allows user two 228*b* to access and drive the personal vehicle. In this scenario, the physical key is not necessary. Rather, the delegation smart contract includes information as to what the device is, the personal vehicle, and to whom the device is going, user two 228*b*. Instead of received the physical key, user two 228*b* may receive the token, or the virtual identification, on the user's personal device, such as a smart phone, which may allow user two 228b to utilize the personal vehicle of user one 228a. As a result, the user of the personal vehicle is delegated from user one 228a to user two 228b. Further, the physical key is not required when the token is delegated.

The delegation of a particular service or device may be temporary. Continuing with the example from above, the delegation smart contract may specify that user two 228b may use the personal vehicle for a particular duration, such as, for example, 24 hours. Once the 24 hours passes, the delegated token expires and user two 228b loses the privileges to utilize the personal vehicle.

All three scenarios may also include a user device service 226a-c. The user device service 226 a-c may refer to a database which may store information respecting the users 228, the devices 224, and the service providers 220 that may be involved in one or more smart contracts.

Figure 3:
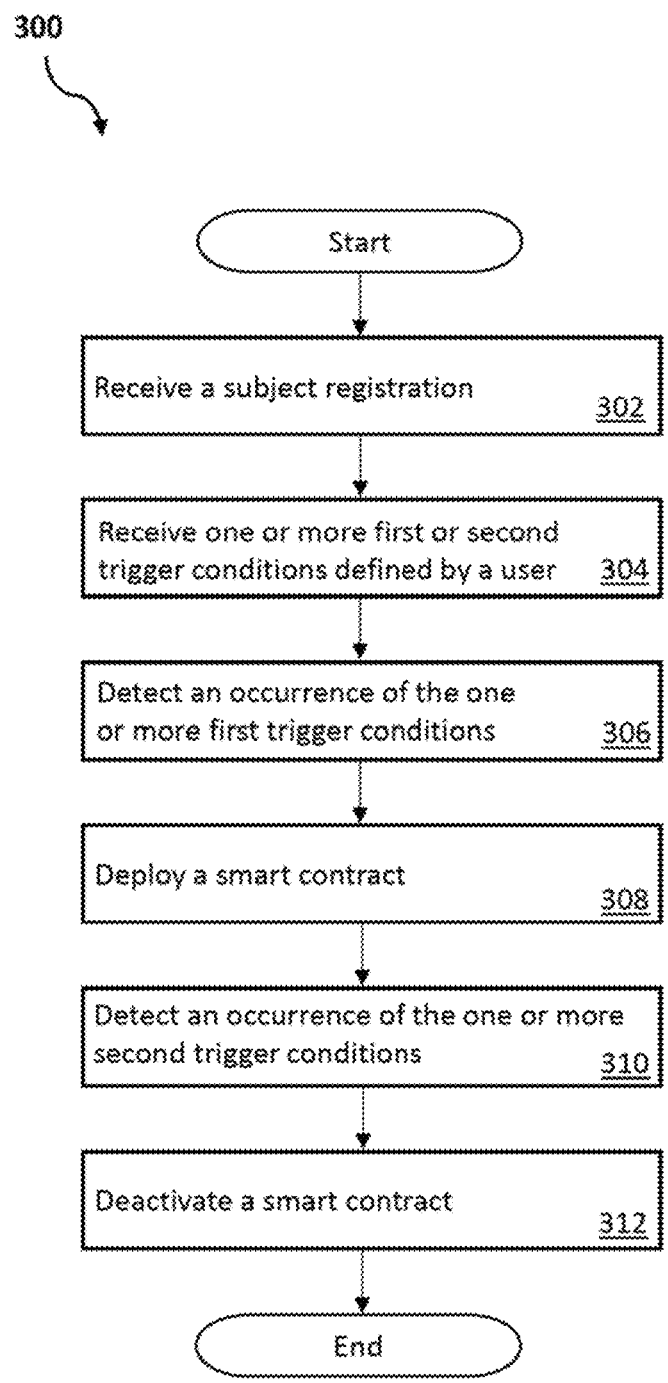
FIG. 3 is an operational flow chart illustrating a process for blockchain enabled reservation and delegation, in accordance with an embodiment of the invention.

Referring now to FIG. 3, an operational flow chart 300 according to at least one embodiment is depicted. The operational flow chart 300 illustrates the reservation and delegation of users, devices, or services by the reservation and delegation program 110a, 110b.

At operation 302, the subject registration is received. The subject may be a service, a device, or a user. For example, the service may refer to any type of service that is provided to the user by the service providers 220a, 220b, described herein with respect to FIG. 2. The device may refer to any device that may be delegated for use. Some non-limiting examples of the device may include a mobile device, a telephone, a personal digital assistant, a netbook, a laptop computer, a tablet computer, a desktop computer, different types of credit cards, or vehicles. The user may be an individual whose device is delegated to another user. The user may also be the individual that delegates service from one service provider to another service provider, or from one device to another device.

The reservation and delegation program 110a, 110b may receive information respecting different service providers 220a, 220b as well as different devices 224a-c. During the registration process, the user may register various service providers 220a, 220b that the user may be utilizing. For example, the user may specify one or more network providers, or one or more cell service providers. In addition, the user may also register the devices 224a-c that the user may utilize with the services provided by the service providers 220a, 220b. It should be appreciated that the user may update a particular subject at any time after the registration process. For example, during the subject registration, the user identifies device A and device B as the two device that may be used with a particular service. The user may specify that device A is a smart phone, and that device B is a tablet.

During the registration process, the reservation and delegation program 110a, 110b may also receive information respecting the smart contract 222. For example, in an embodiment, the smart contract 222 may be setup during the subject registration process. For example, the smart contract 222 between two service providers may be setup during the service provider registration. In an alternative embodiment, the smart contract 222 may be set up after the subject registration process, such as, for example, during the occurrence of a trigger condition or during the deployment of the smart contract 222.

During the registration process, the reservation and delegation program 110a, 110b may also receive identifying information from the user about the user. Some identifying information may include, but is not limited to, the user's personal information, such as, for example, name, mailing and email addresses, or phone number. The reservation and delegation program 110a, 110b may receive any other information that may identify the user, identify the devices, or identify the services and their respective service providers. Further, the reservation and delegation program 110a, 110b may also receive identifying information about other users that may participate in the reservation and delegation of services or devices.

At operation 304, one or more trigger conditions defined by the user is received. The one or more trigger conditions may be one or more first trigger conditions or one or more second trigger conditions. The first trigger condition is a condition that upon its occurrence may initiate the deployment of a smart contract. Some examples of first trigger conditions may include, but are not limited to, indication of a low battery of a registered device, limited service provided by the registered service provider, unavailability of a physical key to a personal vehicle, or a specified time period. For example, the specified time period may refer to a specific amount of time, such as, for example 30 minutes, 1 hour, 24 hours, or even days.

The second trigger condition is a condition that upon its occurrence may initiate the deactivation of the smart contract. Some examples of second trigger conditions may include, but are not limited to, indication of a full battery of a registered device, unlimited services provided by the registered service provider, access to the physical key of the personal vehicle, or expiration of the specified time period. For example, upon the expiration of the specified time period, the occurrence of the second trigger condition is met and the deactivation of the smart contract may be initiated.

At operation 306, an occurrence of the one or more first trigger conditions are detected. In an embodiment, the reservation and delegation program 110a, 110b may automatically detect that one or more first trigger conditions have occurred. For example, the reservation and delegation program 110a, 110b may detect that service provider A has limited service in the area where the user is currently located as soon limited service occurs. In an alternative embodiment, the user may manually trigger the occurrence of the first trigger condition by prompting the reservation and delegation program 110a, 110b to move to operation 308 and deploy a smart contract. For example, the user may be using device A for work purposes. The user may notice that device A is running out of battery. The user may prompt, via the use of an application programming interface, the reservation and delegation program 110a, 110b that a first trigger condition has occurred.

At operation 308, a smart contract 222 is deployed. The reservation and delegation program 110a, 110b may automatically deploy the smart contract 222 once one or more trigger conditions are detected. The smart contract 222 may be both the reservation and delegation smart contract 222. For example, the user is utilizing services provided by service provider A. The user is in a location where the same service may be provided by service provider A and service provider B. The reservation and delegation program 110a, 110b detects that the service provided by service provider A is limited. The reservation and delegation program 110a, 110b may also detect that service provider B does not have any disruption in service at that particular location. As such, the reservation and delegation program 110a, 110b may automatically deploy the smart contract to switch service from service provider A to service provider B. As a result, the user's service is uninterrupted.

As described herein with respect to operation 306, the user may manually trigger the occurrence of the first trigger condition, thus prompting the reservation and delegation program 110a, 110b to deploy the smart contract. Continuing with the example from above, the user may be using device A for work purposes. The user may notice that device A is running out of battery. Utilizing device A, the user may prompt the reservation and delegation program 110a, 110b to deploy the smart contract and delegate service from device A to another device, such as, for example, device B. The user may also prompt the reservation and delegation program 110a, 110b to deploy the smart contract from device B, for example, when device A completely runs out of battery power.

At operation 310, an occurrence of one or more second trigger conditions is detected. Once the smart contract is activated, the reservation and delegation program 110a, 110b may temporarily run the delegation until such time when the reservation and delegation program 110a, 110b detects the occurrence of the second trigger condition. As described herein with respect to operation 304, the second trigger condition may refer to a condition that upon its occurrence may initiate the deactivation of the smart contract. For example, the user is utilizing a service provided by service provider A. However, due to the limited service provided by service provider A, the reservation and delegation program 110a, 110b deploys the smart contract to switch service from service provider A to service provider B. As a result, the user receives service from service provider B for a limited time. The reservation and delegation program 110a, 110b detects that the service provided by service provider A is restored.

Once the occurrence of the second trigger condition is detected, the reservation and delegation program 110a, 110b moves to operation 312 where the smart contract is deactivated. During the deactivation of the smart contract, the reservation and delegation program 110a, 110b may stop running the delegation by removing the delegation. As a result, whatever device or service that was delegated or switched reverts back to its pre-delegation settings. Continuing with the example from above, the reservation and delegation program 110a, 110b detects that service provided by service provider A is fully restored. As a result, the reservation and delegation program 110a, 110b deactivates the smart contract that allowed the switching of service providers from service provider A to service provider B and switches back to service provider A. As such, one the smart contract is deactivated, service provider A resumes providing the service to the user.

In another example, the user may be using device A for work purposes. The user notices that device A is running out of battery. The user prompts the reservation and delegation program 110a, 110b that the first trigger condition has occurred. The reservation and delegation program 110a, 110b activates the smart contract and delegates service from device A to device B. The reservation and delegation program 110a, 110b runs the delegation until it detects the second trigger condition. In this case, the second trigger condition may be the detection of a full battery charge of device A. Once the second trigger condition is detected, the reservation and delegation program 110a, 110b stops the delegation of service to device B. As a result, service reverts back to device A.

It should be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
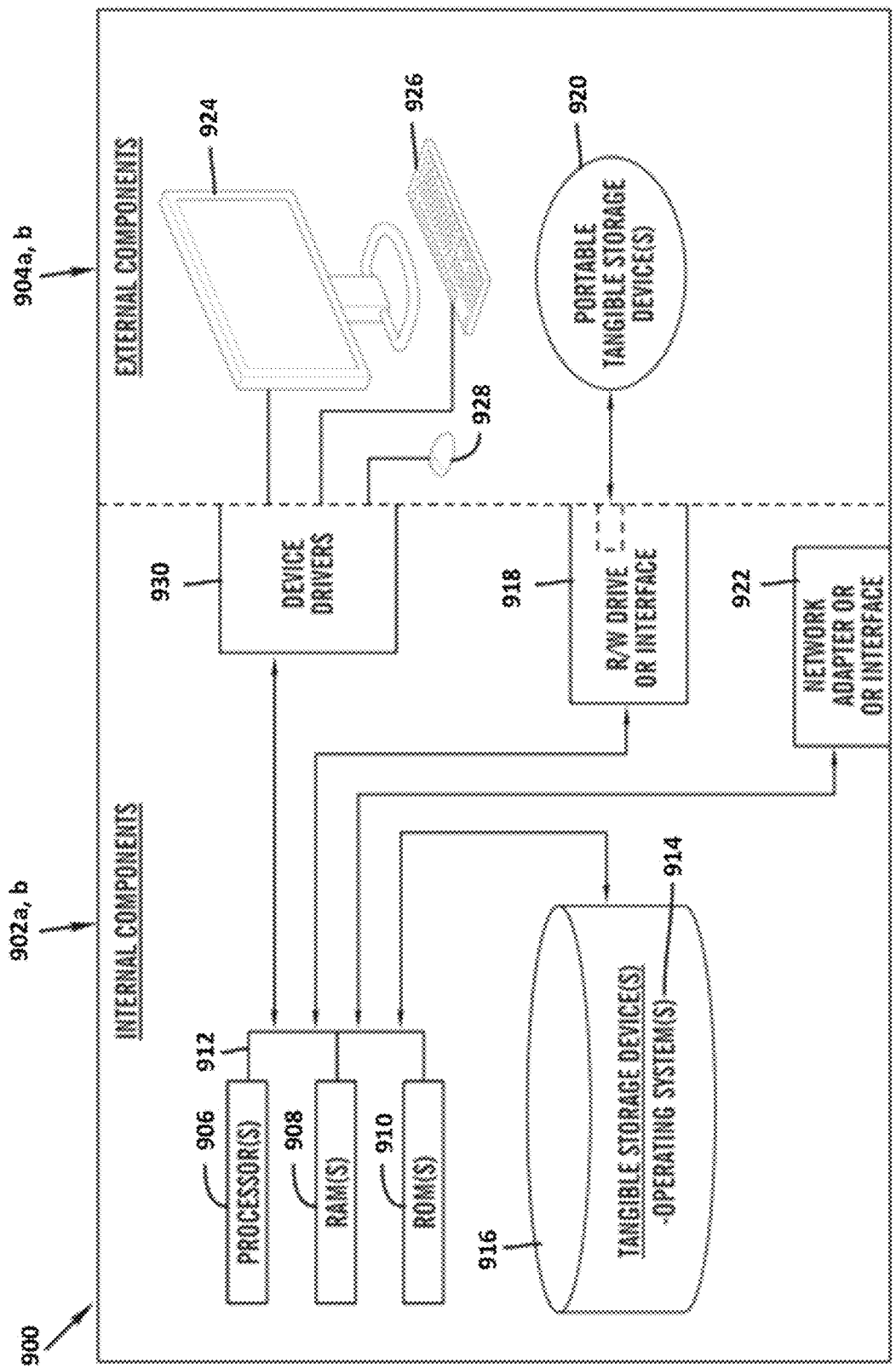
FIG. 4 is a block diagram depicting internal and external components of computers and servers depicted in FIG. 1, in accordance with an embodiment of the invention.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b, and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the reservation and delegation program 110a in client computer 102, and the reservation and delegation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the reservation and delegation program 110a, 110b can be stored on one or more of the respective portable computer-readable tangible storage devices 920, read via the respective R/W drive or interface 918 and loaded into the respective hard drive.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the reservation and delegation program 110a in client computer 102 and the reservation and delegation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the reservation and delegation program 110a in client computer 102 and the reservation and delegation program 110b in network server computer 112 are loaded into the respective hard drive. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems, or storage. The consumer does not manage or control the underlying web-based or cloud-based infrastructure including databases, corpora, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
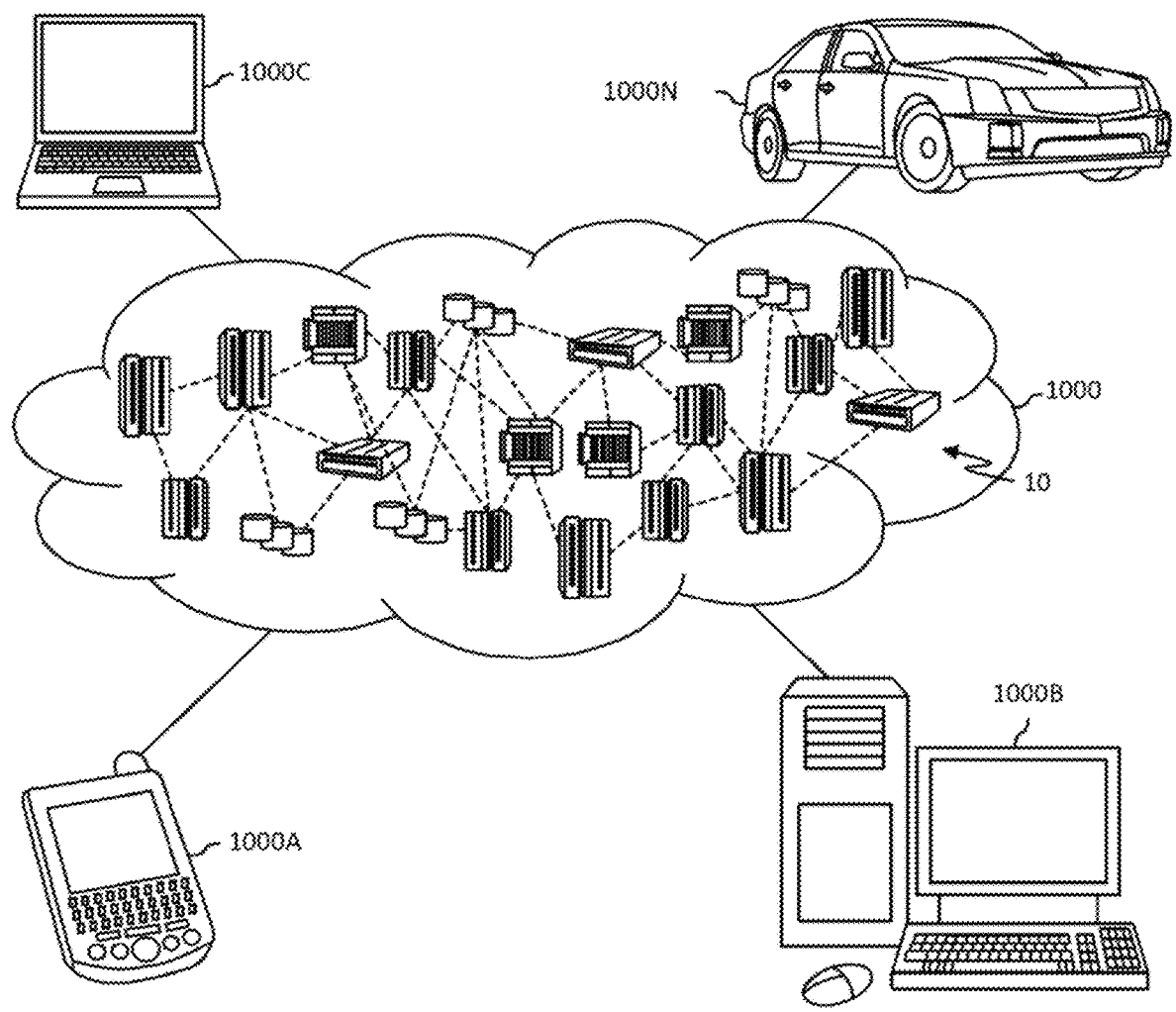
FIG. 5 is a functional block diagram depicting a cloud computing environment including the computer system depicted in FIG. 1, in accordance with an embodiment of the invention.

Referring now to FIG. 5, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 10 and cloud computing environment 1000 can communicate with any type of computerized device over any type of network and/or network addressable connection (e.g., using a web browser).

Figure 6:
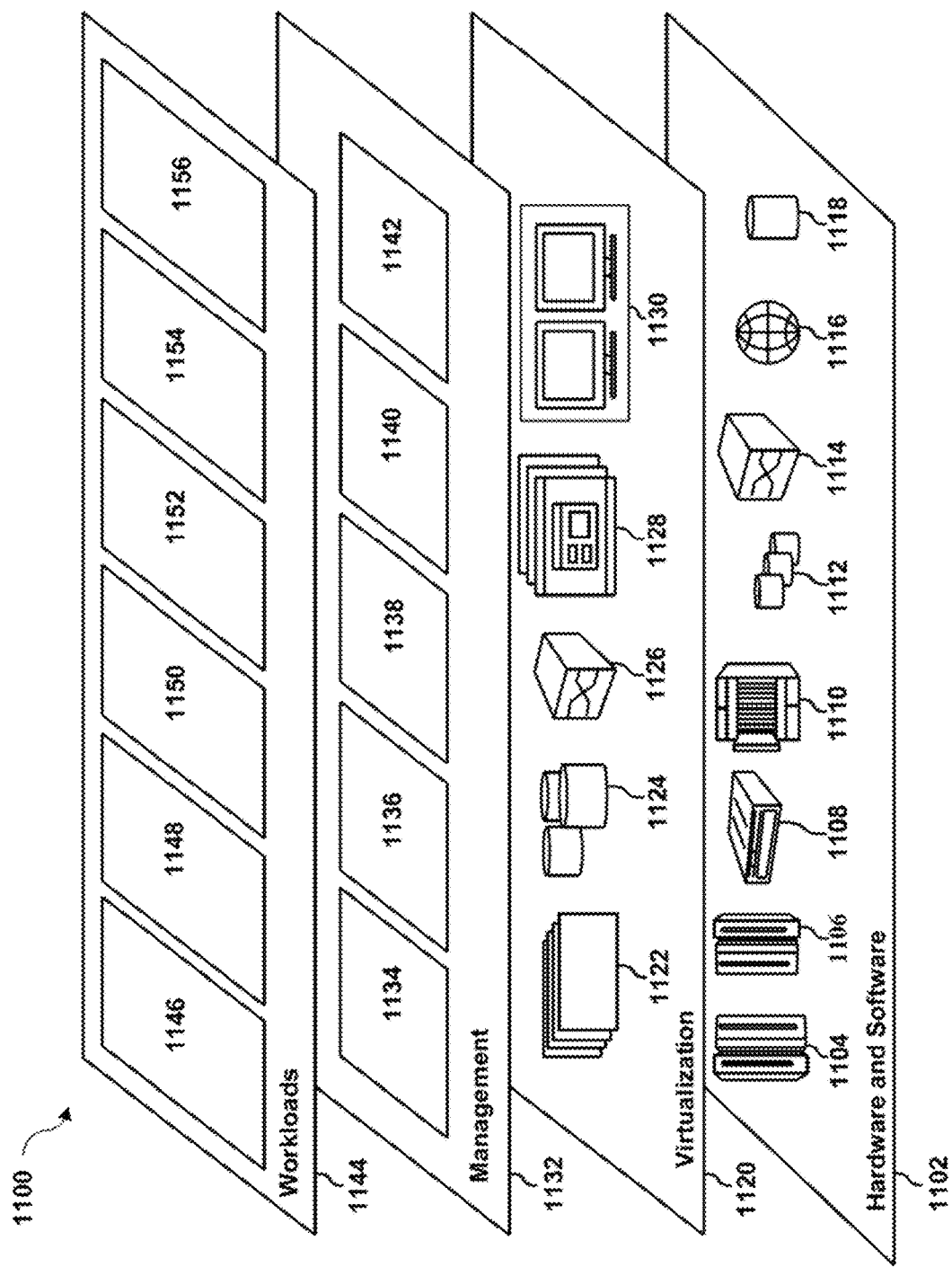
FIG. 6 is a diagram depicting abstraction model layers provided by the cloud computing environment of FIG. 5, in accordance with an embodiment of the invention.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A chatbot generation program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for blockchain enabled reservation and delegation with a plurality of service providers and devices on a distributed network, the computer-implemented method comprising:
    receiving one or more first or second trigger conditions defined by a user;
    detecting an occurrence of the one or more first trigger conditions;
    deploying a smart contract based on the received one or more first trigger conditions, wherein deploying the smart contract comprises: switching from a physical key to a virtual key;
    detecting an occurrence of the one or more second trigger conditions;
    deactivating the smart contract based on the received one or more second trigger conditions; and
    executing a temporary delegation that allows switching from one service provider to another service provider or switching from one device to another device without interruption to the user.

2. The computer-implemented method of claim 1, further comprising:
    receiving a subject registration, wherein the subject is the user, a service, or a device.

3. The computer-implemented method of claim 1, wherein the one or more first trigger conditions is a condition that upon its occurrence initiates the deployment of the smart contract.

4. The computer-implemented method of claim 1, wherein the one or more second trigger conditions is a condition that upon its occurrence initiates the deactivation of the smart contract.

5. The computer-implemented method of claim 1, wherein the smart contract is a reservation smart contract or a deployment smart contract.

6. The computer-implemented method of claim 1, wherein deploying the smart contract comprises: running a delegation, the delegation is one or more of switching from one service provider to another service provider, switching from one device to another device.

7. The computer-implemented method of claim 1, wherein deactivating the smart contract comprises:
    removing a delegation; and
    reverting back to a pre-delegation setting.

8. A computer system for blockchain enabled reservation and delegation with a plurality of service providers and devices on a distributed network, comprising: one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
  receiving one or more first or second trigger conditions defined by a user;
  detecting an occurrence of the one or more first trigger conditions;
  deploying a smart contract based on the received one or more first trigger conditions, wherein deploying the smart contract comprises: switching from a physical key to a virtual key;
  detecting an occurrence of the one or more second trigger conditions;
  deactivating the smart contract based on the received one or more second trigger conditions; and
  executing a temporary delegation that allows switching from one service provider to another service provider or switching from one device to another device without interruption to the user.

9. The computer system for blockchain enabled reservation and delegation of claim 8, further comprising:
  receiving a subject registration, wherein the subject is the user, a service, or a device.

10. The computer system for blockchain enabled reservation and delegation of claim 8, wherein the one or more first trigger conditions is a condition that upon its occurrence initiates the deployment of the smart contract.

11. The computer system for blockchain enabled reservation and delegation of claim 8, wherein the one or more second trigger conditions is a condition that upon its occurrence initiates the deactivation of the smart contract.

12. The computer system for blockchain enabled reservation and delegation of claim 8, wherein the smart contract is a reservation smart contract or a deployment smart contract.

13. The computer system for blockchain enabled reservation and delegation of claim 8, wherein deploying the smart contract comprises: running a delegation, the delegation is one or more of switching from one service provider to another service provider, switching from one device to another device.

14. The computer system for blockchain enabled reservation and delegation of claim 8, wherein deactivating the smart contract comprises:
  removing a delegation; and
  reverting back to a pre-delegation setting.

15. A computer program product for blockchain enabled reservation and delegation with a plurality of service providers and devices on a distributed network, comprising: one or more computer-readable tangible storage media and program instructions stored on at least one of the one or more computer-readable tangible storage media, the program instructions executable by a processor to cause the processor to perform a method comprising:
  receiving one or more first or second trigger conditions defined by a user;
  detecting an occurrence of the one or more first trigger conditions;
  deploying a smart contract based on the received one or more first trigger conditions, wherein deploying the smart contract comprises: switching from a physical key to a virtual key;
  detecting an occurrence of the one or more second trigger conditions;
  deactivating the smart contract based on the received one or more second trigger conditions; and
  executing a temporary delegation that allows switching from one service provider to another service provider or switching from one device to another device without interruption to the user.

16. The computer program product for blockchain enabled reservation and delegation of claim 15, further comprising:
  receiving a subject registration, wherein the subject is the user, a service, or a device.

17. The computer program product for blockchain enabled reservation and delegation of claim 15, wherein the one or more first trigger conditions is a condition that upon its occurrence initiates the deployment of the smart contract.

18. The computer program product for blockchain enabled reservation and delegation of claim 15, wherein the one or more second trigger conditions is a condition that upon its occurrence initiates the deactivation of the smart contract.

19. The computer program product for blockchain enabled reservation and delegation of claim 15, wherein the smart contract is a reservation smart contract or a deployment smart contract.

20. The computer program product for blockchain enabled reservation and delegation of claim 15, wherein deploying the smart contract comprises: running a delegation, the delegation is one or more of switching from one service provider to another service provider, switching from one device to another device.

* * * * *